United States Patent
Baek et al.

(10) Patent No.: US 11,917,714 B2
(45) Date of Patent: Feb. 27, 2024

(54) DISPLAY DEVICE FOR MANAGING EXTERNAL DEVICE CONNECTED THERETO THROUGH BLUETOOTH COMMUNICATION AND METHOD FOR MANAGING BLUETOOTH-CONNECTED EXTERNAL DEVICE

(71) Applicant: LG ELECTRONICS INC., Seoul (KR)

(72) Inventors: Sanghyun Baek, Seoul (KR); Obong An, Seoul (KR); Eunyoung Cho, Seoul (KR); Sangjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 17/305,087

(22) Filed: Jun. 30, 2021

(65) Prior Publication Data

US 2022/0272791 A1 Aug. 25, 2022

(30) Foreign Application Priority Data

Feb. 22, 2021 (KR) ........................ 10-2021-0023514

(51) Int. Cl.
*H04W 76/38* (2018.01)
*G09G 5/00* (2006.01)
*H04W 4/80* (2018.01)

(52) U.S. Cl.
CPC ............ *H04W 76/38* (2018.02); *G09G 5/006* (2013.01); *H04W 4/80* (2018.02); *G09G 2370/16* (2013.01)

(58) Field of Classification Search
CPC ....... H04W 76/38; H04W 4/80; H04W 36/30; H04W 36/08; H04W 40/12; H04W 40/36; G09G 5/00
See application file for complete search history.

(56) References Cited

U.S. PATENT DOCUMENTS

| 2011/0213901 A1 | 9/2011 | Rostaing et al. |
| 2012/0322376 A1 | 12/2012 | Couse |
| 2013/0007307 A1 | 1/2013 | Kang et al. |
| 2013/0132613 A1 | 5/2013 | Chassot et al. |

(Continued)

FOREIGN PATENT DOCUMENTS

KR 1020200032080 3/2020

OTHER PUBLICATIONS

PCT International Application No. PCT/KR2021/007786, International Search Report dated Nov. 10, 2021, 3 pages.

*Primary Examiner* — Iqbal Zaidi
(74) *Attorney, Agent, or Firm* — LEE, HONG, DEGERMAN, KANG & WAIMEY (57) ABSTRACT

The present disclosure provides a display device including: a communication interface configured to perform Bluetooth communication with at least one external device; and a processor configured to obtain a list of connected devices including information about at least one external device Bluetooth-paired or connected with the display device through the communication interface, and obtain first execution information about a first application being executed on the display device, obtain first necessary device condition information required by the first application based on the first execution information, and release a connection with at least one external device not satisfying the first necessary device condition information in the list of connected devices.

13 Claims, 8 Drawing Sheets

(56) References Cited

U.S. PATENT DOCUMENTS

| | | | |
|---|---|---|---|
| 2014/0199947 A1* | 7/2014 | Jung | H04B 7/26 |
| | | | 455/566 |
| 2018/0101199 A1* | 4/2018 | Myung | G09G 3/002 |
| 2019/0281547 A1 | 9/2019 | Yoon et al. | |
| 2022/0272791 A1* | 8/2022 | Baek | H04W 8/005 |

* cited by examiner

DISPLAY DEVICE FOR MANAGING EXTERNAL DEVICE CONNECTED THERETO THROUGH BLUETOOTH COMMUNICATION AND METHOD FOR MANAGING BLUETOOTH-CONNECTED EXTERNAL DEVICE

CROSS-REFERENCE TO RELATED APPLICATIONS

Pursuant to 35 U.S.C. § 119 (a), this application claims the benefit of an earlier filing date and right of priority to Korean Patent Application No. 10-2021-0023514 filed on Feb. 22, 2021, the contents of which is hereby incorporated by reference herein in its entirety.

BACKGROUND

The present disclosure relates to a display device for managing a Bluetooth-connected device and a method for managing a Bluetooth-connected device, and more particularly, to a display device and a method for managing a Bluetooth-connected device, which enables Bluetooth communication connection with external devices that is required according to an application being executed on the display device.

As devices capable of Bluetooth communication become popular, the types of Bluetooth devices connected to display devices are increasing.

However, due to the limitation of hardware or software resources of the display device, there may be a limitation to the number of Bluetooth devices that can be connected to the display device.

In addition, the types of external Bluetooth devices required may be different depending on the types of application being executed on the display device and the state in which the application is being executed.

Therefore, when external Bluetooth devices are connected to the display device as many as the maximum number of connectable devices, there is a need for a technology that allows other external Bluetooth devices to be connected by managing the previously connected external Bluetooth devices.

SUMMARY

The present disclosure aims that, in a display device in which the number of external devices connectable through Bluetooth communication is limited, the number of connectable devices is secured by automatically releasing a connection with external devices that are not required to execute an application among external devices already connected through Bluetooth communication so as to enable Bluetooth communication connection with external devices required according to an application being executed on the display device.

In addition, the present disclosure aims that, when the application being executed on the display device is changed, the number of connectable devices is secured to enable Bluetooth connection with external devices required by the changed application by releasing a connection with Bluetooth-connected external devices not required in the previously changed application for Bluetooth connection with external devices required according to the changed application.

In addition, the present disclosure aims that, when the number of external devices Bluetooth-paired with the display device exceeds the number of Bluetooth-connectable devices, resources for Bluetooth connection with external devices that are frequently used are secured by maintaining or releasing a connection with the Bluetooth connection with external devices in the descending order of frequency of use according to the application.

A display device according to an embodiment of the present disclosure includes: a communication interface configured to perform Bluetooth communication with at least one external device; and a processor configured to obtain a list of connected devices including information about at least one external device Bluetooth-paired or connected with the display device through the communication interface, and obtain first execution information about a first application being executed on the display device, obtain first necessary device condition information required by the first application based on the first execution information, and release a connection with at least one external device not satisfying the first necessary device condition information in the list of connected devices.

A method for managing a Bluetooth-connected external device includes: performing Bluetooth communication with at least one external device; obtaining a list of connected devices including information about at least one external device Bluetooth-paired or connected; obtaining first execution information about a first application being executed on the display device; obtaining first necessary device condition information required by the first application based on the first execution information; and releasing a connection with at least one external device not satisfying the first necessary device condition information in the list of connected devices.

DETAILED DESCRIPTION OF THE EMBODIMENTS

Hereinafter, specific embodiments of the present disclosure will be described in detail with reference to the drawings.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
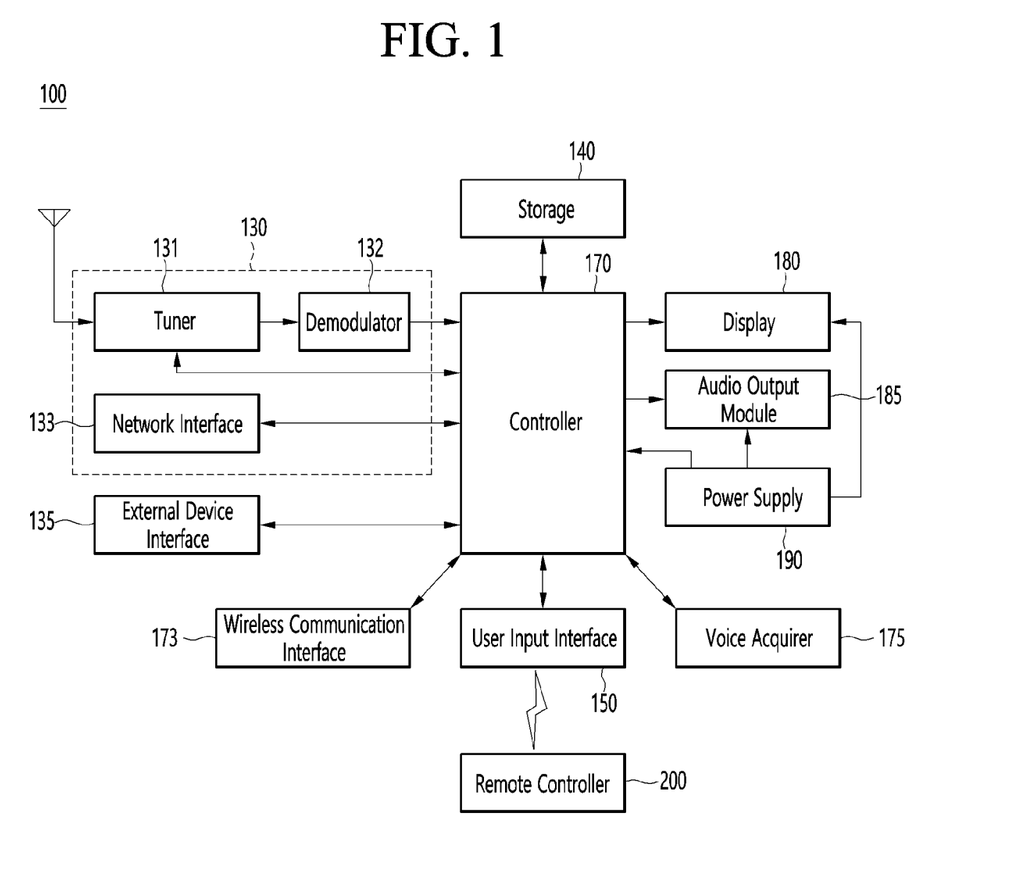
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast receiver 130, an external device interface 135, a storage 140, a user interface 150, a controller, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including the Internet network. The network interface 133 can transmit or receive data to or from another user or another electronic device through an accessed network or another network linked to the accessed network.

The network interface 133 can access a predetermined webpage through an accessed network or another network linked to the accessed network. In other words, the network interface 133 can transmit or receive data to or from a corresponding server by accessing a predetermined webpage through the network.

Then, the network interface 133 can receive contents or data provided from a content provider or a network operator. In other words, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an Internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one an image or audio output from an external device that is wirelessly or wiredly connected to the display device 100 and deliver it to the controller 170. The external device interface 135 can include a plurality of external input terminals. The plurality of external input terminals can include an RGB terminal, at least one High Definition Multimedia Interface (HDMI) terminal, and a component terminal.

An image signal of an external device input through the external device interface 135 can be output through the display 180. A voice signal of an external device input through the external device interface 135 can be output through the audio output interface 185.

An external device connectable to the external device interface 135 can be one of a set-top box, a Blu-ray player, a DVD player, a game console, a sound bar, a smartphone, a PC, a USB Memory, and a home theater system, but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily storing image, voice, or data signals output from the external device interface 135 or the network interface 133 and can store information on a predetermined image through a channel memory function.

The storage 140 can store an application or an application list input from the external device interface 135 or the network interface 133.

The display device 100 can play content files (for example, video files, still image files, music files, document files, application files, and so on) stored in the storage 140 and provide them to a user.

The user interface 150 can deliver signals input by a user to the controller 170 or deliver signals from the controller 170 to a user. For example, the user interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user interface 150 can deliver, to the controller 170, control signals input from local keys (not illustrated) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface 135.

Voice signals processed in the controller 170 can be output to the audio output interface 185. Additionally, voice signals processed in the controller 170 can be input to an external output device through the external device interface 135.

Besides that, the controller 170 can control overall operations in the display device 100.

Additionally, the controller 170 can control the display device 100 by a user command or internal program input through the user interface 150 and download a desired application or application list into the display device 100 in access to network.

The controller 170 can output channel information selected by a user together with processed image or voice signals through the display 180 or the audio output interface 185.

Additionally, according to an external device image playback command received through the user interface 150, the controller 170 can output image signals or voice signals of an external device such as a camera or a camcorder, which are input through the external device interface 135, through the display 180 or the audio output interface 185.

Moreover, the controller 170 can control the display 180 to display images and control broadcast images input through the tuner 131, external input images input through the external device interface 135, images input through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

The wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HIVID)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or on-screen display (OSD) signals, which are processed in the controller 170, or images signals or data signals, which are received in the external device interface 135, into R, G, and B signals to generate driving signals Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
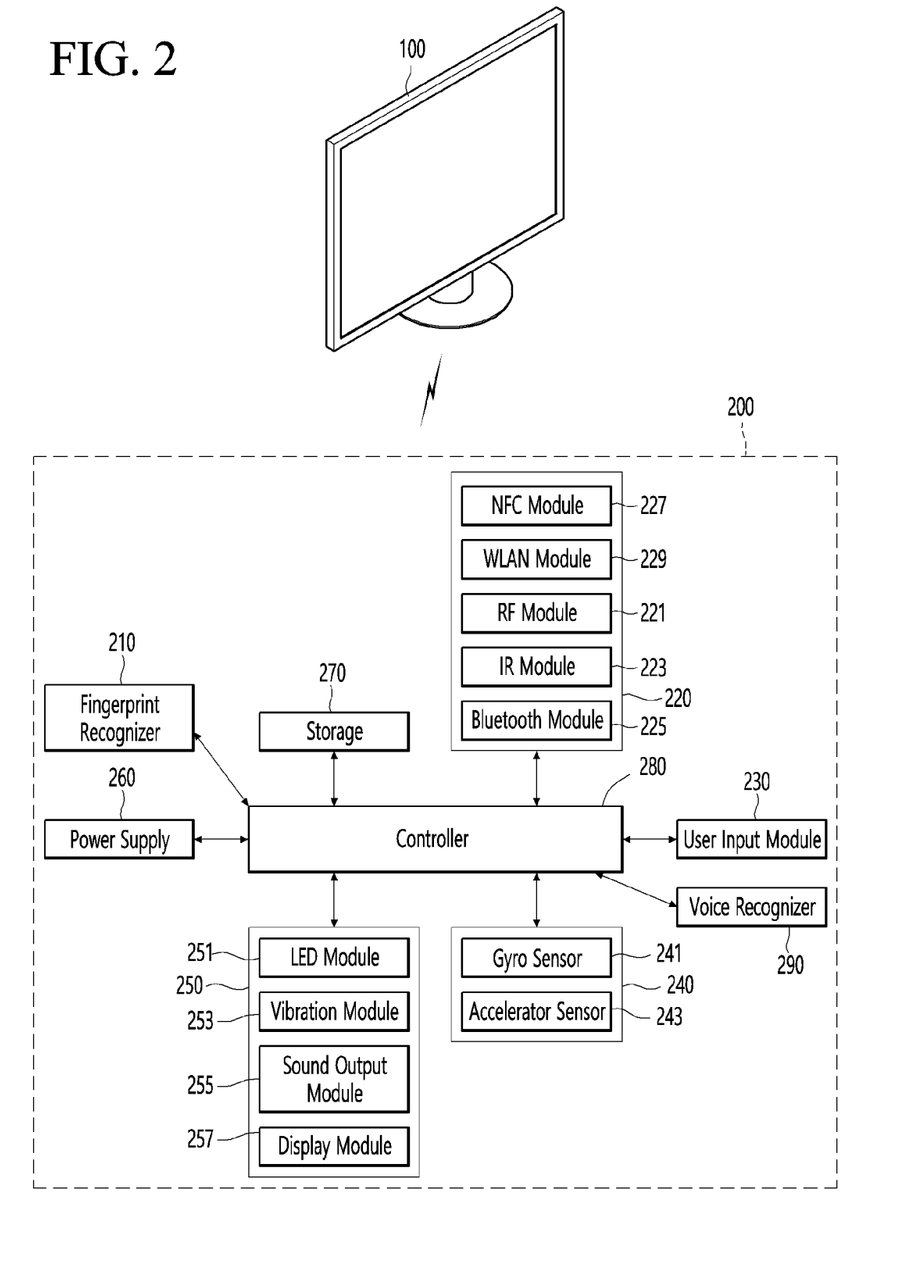
FIG. 2 is a block diagram illustrating a remote control device according to an embodiment of the present disclosure.
Figure 3:
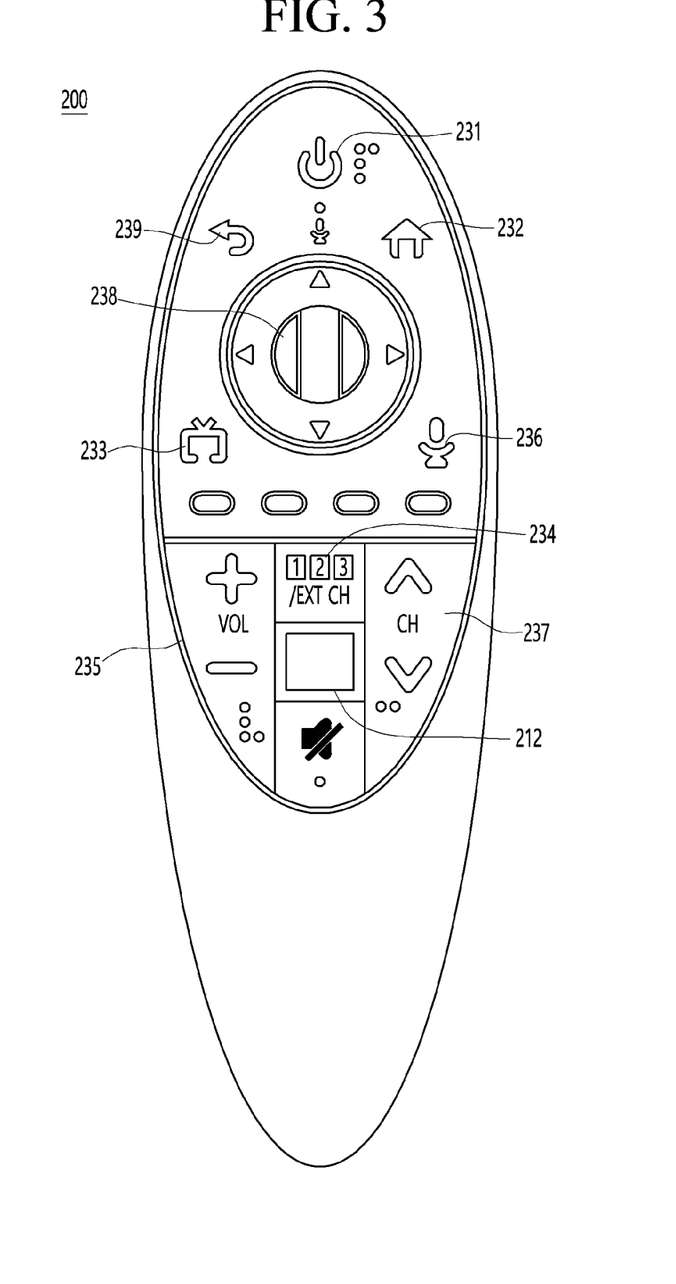
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognizer 210, a wireless communication interface 220, a user input interface 230, a sensor module 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a wireless communication module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor module 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 225.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to control of the remote control device 200. The controller 280 can transmit a signal corresponding to a predetermined key manipulation of the user input interface 230 or a signal corresponding to movement of the remote control device 200 sensed by the sensor module 240 to the display device 100 through the wireless communication interface 225.

Additionally, the voice acquisition module 290 of the remote control device 200 can obtain voice.

The voice acquisition module 290 can include at least one microphone 291 and obtain voice through the microphone 291.

Figure 4:
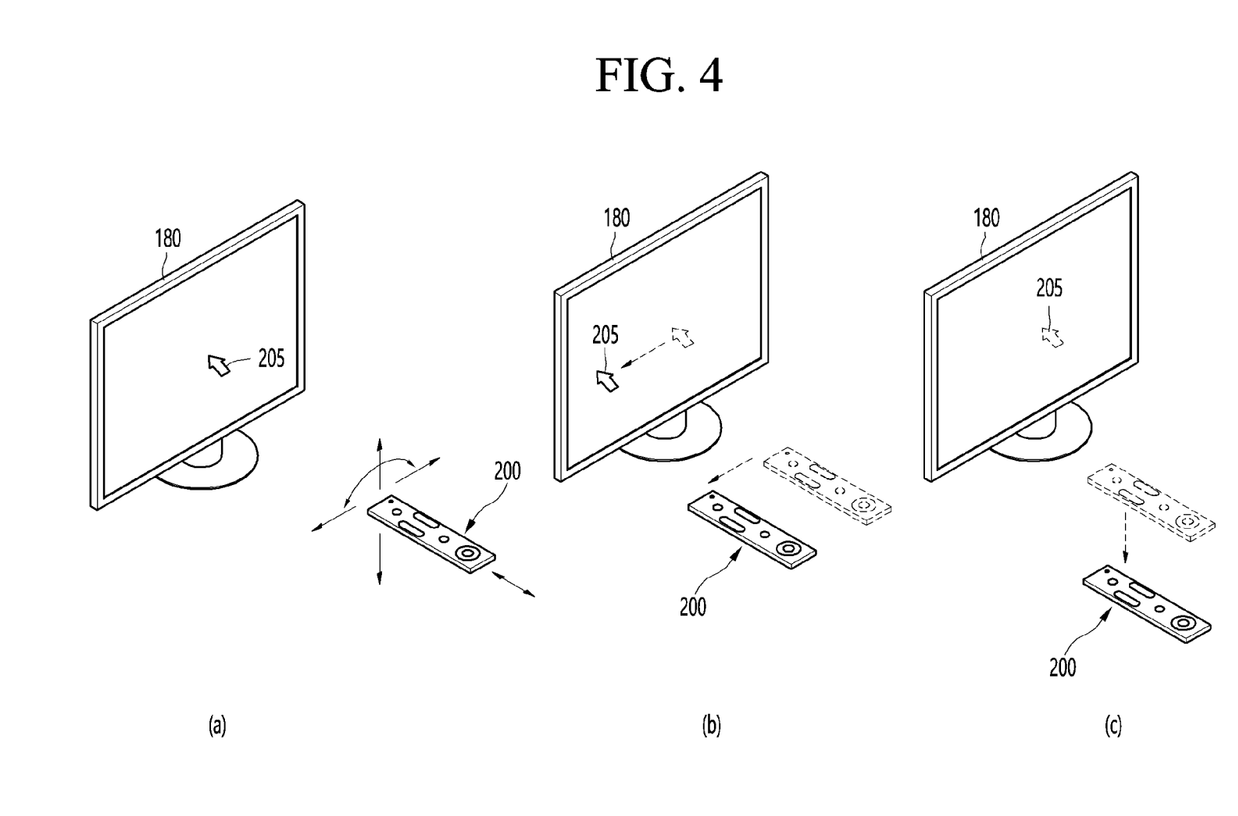
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(a) illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display 180. Thus, a selection area in the display 180 corresponding to the pointer 205 can be zoomed in and displayed larger.

On the contrary, if the user moves the remote control device 200 to approach the display 180, the selection area in the display 180 corresponding to the pointer 205 may be zoomed out and reduced.

On the other hand, if the remote control device 200 is moved away from the display 180, a selection area can be zoomed out and if the remote control device 200 is moved closer to the display 180, a selection area can be zoomed in.

Additionally, if a specific button in the remote control device 200 is pressed, recognition of a vertical or horizontal movement can be excluded. In other words, if the remote control device 200 is moved away from or closer to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Meanwhile, the controller 170 may also be referred to as a processor 170. The wireless communication interface 173 may also be referred to as a communication interface 173. The storage 140 may also be referred to as a memory 140.

Figure 5:
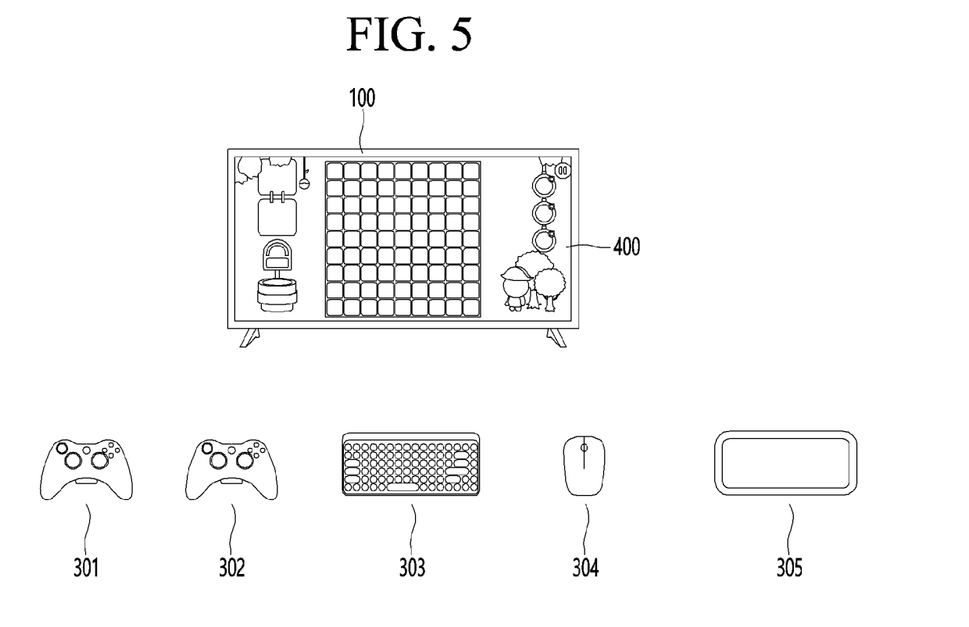
FIG. 5 is a view illustrating external devices connected through Bluetooth communication, according to an embodiment of the present disclosure.

FIG. 5 is a view illustrating a display device connected to an external device through Bluetooth communication, according to an embodiment of the present disclosure.

The display device 100 may perform Bluetooth communication with at least one external device 300 through the communication interface 173.

The display device 100 may be Bluetooth-paired with at least one external device 300 through the communication interface 173.

Bluetooth pairing may refer to a state in which the display device 100 and the at least one external device 300 recognizes each other and shares a certain key to be used in an authentication process so that mutually encrypted connection can be established.

Meanwhile, the display device 100 may be Bluetooth-connected with the at least one external device 300 through the communication interface 173 so that data is transmitted and received through Bluetooth communication.

Bluetooth connection refers to a state in which the display device 100 and the at least one external device 300 shares a certain channel so that data can be transmitted and received with each other.

The processor 170 of the display device 100 may execute a certain application 400.

In addition, the display device 100 may transmit and receive data from the at least one external device 300 through the communication interface 173, so that a command for controlling a certain application 400 is received or data output by the certain application 400 is transmitted to the at least one external device 300.

For example, when the application 400 executed on the display device 100 is a game application, the display device 100 may be connected to a first game controller 301 and a second game controller 302 supporting Bluetooth communication through the communication interface 173 to receive an operation command for the application 400. In addition, the display device 100 may be connected to a keyboard 303 or a mouse 304 supporting Bluetooth communication through the communication interface 173 to receive an operation command for the application 400. In addition, a speaker 305 Bluetooth-connected with the display device 100 may receive sound information generated by the execution of the application 400 from the display device 100 and output sound.

Figure 6:
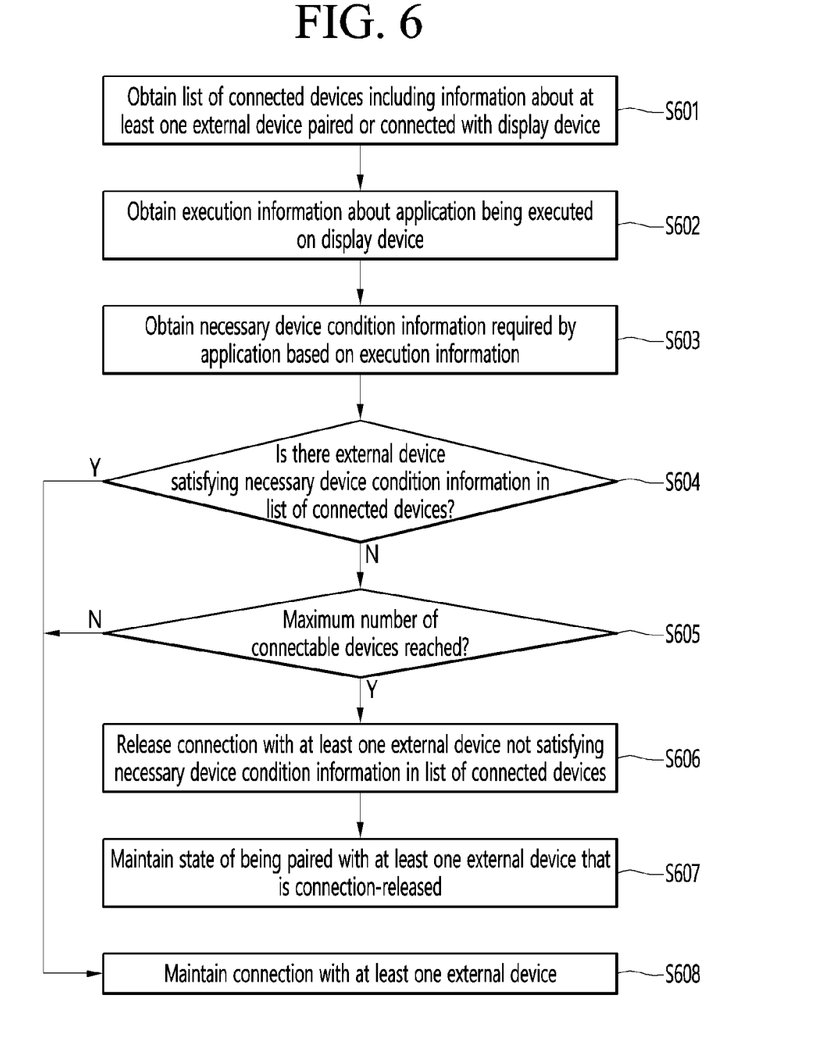
FIG. 6 is a flowchart for describing a method of managing an external device connected through Bluetooth communication, according to an embodiment of the present disclosure.

FIG. 6 is a flowchart for describing a method of managing an external device connected through Bluetooth communication according to an embodiment of the present disclosure.

The processor 170 may obtain a connection list including information about the at least one external device Bluetooth-paired or connected with the display device 100 through the communication interface 173 (S601).

The connection list may include external device information about each of the at least one external device Bluetooth-paired or connected with the display device 100. The external device information may include information about identification information, device name, device function, and the like of the external device. The information about the device function may be classified according to the function of the external device. For example, the information about the device function may be classified according to the function of the external device such as a game controller, a keyboard, a mouse, and a speaker.

In addition, the processor 170 may obtain execution information about the application being executed on the display device 100 (S602).

The execution information may store information about an application name, whether the application is executed in the foreground, an execution start time of the application, a necessary device condition required for execution of the application, input request information, and output request information.

Meanwhile, the input request information may be information about whether the application is executing an operation that requires an input of a user. In addition, when the input of the user is requested, the necessary device condition information may include information about a device type for the input of the user.

Meanwhile, the output request information may be information about whether the application is executing an operation that requires sound output. In addition, when the sound output is requested, the necessary device condition information may include information about a device type for the sound output.

In addition, the processor 170 may obtain necessary device condition information required by the application based on the execution information (S603).

The necessary device condition information may be condition information about the devices required to execute the application. For example, in the execution of the application, various external devices such as a game controller, a keyboard, a mouse, and a speaker may be required.

Meanwhile, the processor 170 may determine whether there is an external device that does not satisfy the necessary device condition information in a list of connected devices.

In addition, the processor 170 may release the connection with the at least one external device not satisfying the necessary device condition information from the list of connected devices (S606).

Figure 7:
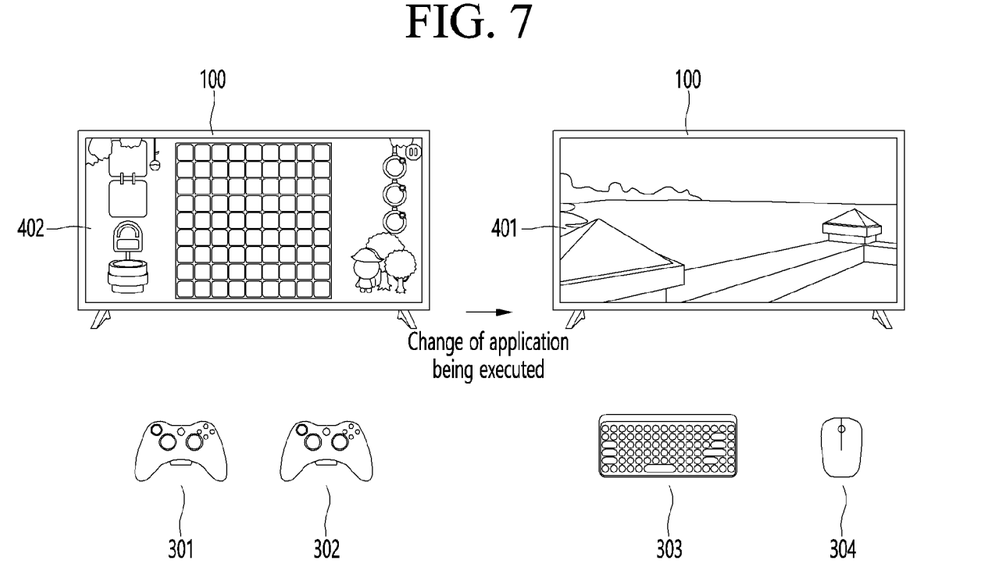
FIG. 7 is a diagram for describing a method of releasing a connection with an external device according to a change in an application to be executed, according to an embodiment of the present disclosure.

Referring to FIG. 7, when a first application 401 currently executed on the display device 100 is an image playback application, the external device connected with the display device 100 in the first application 401 may be an external device for a second application 402 that has been previously executed. For example, when the second application 402 is executed, both the first external device 301 and the second external device 302 connected with the display device 100 may be game controllers.

The processor 170 may obtain necessary device condition information required by the first application 401 based on the execution information of the first application 401 currently being executed, and can determine that the necessary devices required by the first application 401 are a keyboard and a mouse.

The processor 170 may determine that the first external device 301 and the second external device 302 Bluetooth-connected with the display device are external devices that do not satisfy the necessary device condition information required by the first application based on the list of connected devices.

The processor 170 may release the connection with the first external device 301 and the second external device 302 that do not satisfy the necessary device condition information in the list of connected devices. Therefore, the processor 170 may secure Bluetooth communication resources for Bluetooth connection between the third external device 303 and the fourth external device 304 that satisfy the necessary device condition information required by the first application 401.

In addition, when the connection with the at least one external device is released, the processor 170 may maintain a state of being paired with the at least one external device that is connection-released (S607). Therefore, even when the necessary equipment condition is changed due to the change in the application executed on the display device 100 in the future and thus the Bluetooth connection with the connection-released external device is required, it is possible to immediately perform the Bluetooth connection with the external device that maintains the paired state.

Meanwhile, the processor 170 may determine whether there are all the external devices 300 satisfying the necessary device condition information among the at least one external device 300 Bluetooth-connected with the display device 100 based on the list of connected devices (S604).

When there is the external device 300 that satisfies the necessary device condition information based on the list of connected devices, the processor 170 may maintain the connection with the at least one external device 300 Bluetooth-connected with the display device 100 (S608). Therefore, it is possible to prevent unnecessary disconnection operation from being performed.

Meanwhile, the processor 170 may determine that the number of at least one external device 300 Bluetooth-connected with the display device 100 has reached the maximum number of connectable devices based on the list of connected devices (S605).

The number of external devices that are Bluetooth-connectable may be changed according to the resource capacity of the display device 100. For example, the maximum number of external devices that are Bluetooth-connectable with the display device 100 may be preset to a certain value.

When the number of external devices 300 that are connectable with the display device 100 reaches the maximum number of connectable devices, the processor 170 may previously release the connection with unnecessary external devices in order to secure the Bluetooth resources for the external device that needs to be newly Bluetooth-connected due to the change in the necessary device condition information of the application.

When the number of the at least one external device 300 Bluetooth-connected with the display device 100 reaches the maximum number of connectable devices based on the list of connected devices, the processor 170 may release the connection with the at least one external device 300 not satisfying the necessary device condition information in the list of connected devices.

Figure 8:
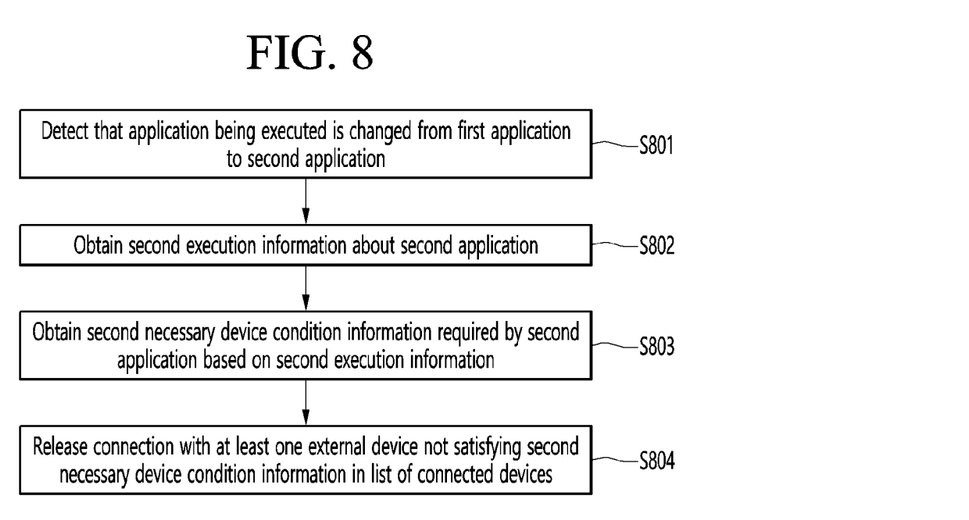
FIG. 8 is a flowchart for describing a method of releasing a connection with an external device according to a change in an application to be executed, according to an embodiment of the present disclosure.

FIG. 8 is a flowchart for describing a method of releasing a connection with an external device according to a change in an application to be executed, according to an embodiment of the present disclosure.

The processor 170 may detect that the application being executed on the display device 100 is changed from a first application to a second application (S801). The application being executed on the display device 100 may be an application that is executed in the foreground of the display device 100.

The processor 170 may obtain second execution information about the changed second application (S802).

The processor 170 may obtain second necessary device condition information required by the second application based on the second execution information (S803).

The processor 170 may release the connection with the at least one external device 300 not satisfying the second necessary device condition information from the list of connected devices (S804). Therefore, when the application being executed on the display device 100 is changed, the Bluetooth connection resources for the changed application may be secured by releasing the Bluetooth connection with the unnecessary external device.

Figure 9:
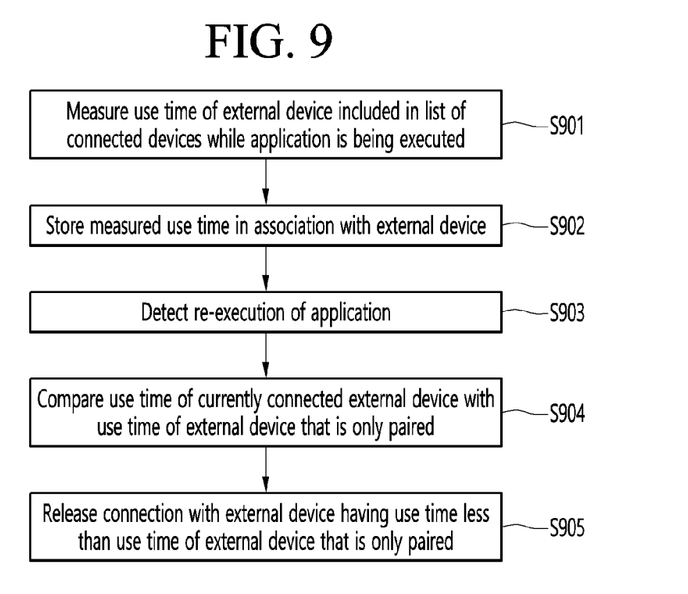
FIG. 9 is a flowchart for describing a method of securing Bluetooth connection resources for an external device used frequently in an application, according to an embodiment of the present disclosure.

FIG. 9 is a flowchart for describing a method of securing Bluetooth connection resources for an external device used frequently in an application, according to an embodiment of the present disclosure.

The processor 170 may measure the use time of each of the at least one external device 300 included in the list of connected devices while the application is being executed on the display device 100 (S901).

For example, the processor 170 may measure the use time of a game controller, which is a Bluetooth-connected external device, while a certain game application is being executed on the display device 100.

The processor 170 may store the use time measured for each of the at least one external device in the memory 140 in association with each of the at least one external device (S902).

When the application is re-executed, the processor 170 may compare the use time of each of the at least one external device 300 connected with the display device 100 with the use time of each of the at least one external device 300 that is only paired with the display device 100, based on the list of connected devices (S904).

In addition, the processor 170 may release the connection with the at least one external device, Bluetooth-connected with the display device 100, which has the use time less than the use time of each of the at least one external device that is only paired with the display device 100 (S905).

For example, when the game application is re-executed, the use time of the keyboard connected with the display device 100 through Bluetooth communication is 10 minutes, and the use time of the game controller that is only paired with the display device 100 through Bluetooth communication is 2 hours, the processor 170 may release the connection with the keyboard in order to secure the Bluetooth connection resources for the game controller.

Figure 10:
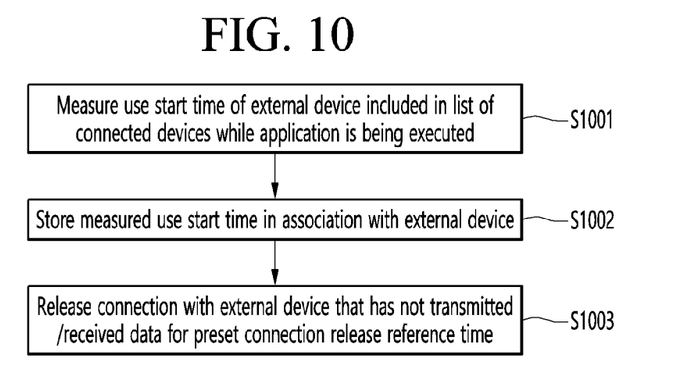
FIG. 10 is a flowchart for describing a method of securing Bluetooth connection resources by releasing a connection with an external device that is not used for a certain time in an application, according to an embodiment of the present disclosure.

FIG. 10 is a flowchart illustrating a method of securing Bluetooth connection resources by releasing a connection with an external device that is not used for a certain time in an application, according to an embodiment of the present disclosure.

The processor 170 may measure use start time information of each of the at least one external device included in the connection list while an application is being executed (S1001). The use start time information may refer to a time when the connection between the display device 100 and the external device 300 starts through Bluetooth communication while the application is being executed.

The processor 170 may store the use start time information measured for each of the at least one external device 300 in the memory 140 in association with each of the at least one external device (S1002).

The processor 170 may release the connection with the external device 300 that has not transmitted/received certain data for a preset connection release reference period based on the use start time of each of the at least one external device 300 included in the list of connected devices while the application is being executed (S1003). Therefore, the Bluetooth connection resources may be secured by releasing the Bluetooth connection with the external device that has not been used for a certain time.

Meanwhile, the processor 170 may detect that execution information about the application executed on the display device 100 is changed.

For example, in the display device 100, the application may output an interface requesting an input of a certain character through a Bluetooth keyboard during execution. In this case, the execution information may include input request information indicating that the application is executing an operation requiring an input of a user, and the necessary device condition information may include information about a device type for input.

In addition, for example, in the display device 100, an operation of outputting a certain sound through a Bluetooth speaker during the execution of the application may be required. In this case, the execution information may include output request information indicating that the application is executing an operation requiring sound output, and the necessary device condition information may include information about a device type for sound output.

Meanwhile, the processor 170 may determine whether the input of the user is requested in the application based on the input request information included in the execution information.

When the input of the user is requested, the processor 170 may release the connect with at least one external device not satisfying the necessary device condition information about the device type for the input in the list of connected devices. Therefore, when the connection of the Bluetooth device required for the input of the user is required according to the execution of the application, the Bluetooth connection resources may be secured by releasing the Bluetooth connection with another external device.

Meanwhile, the processor 170 may determine whether the application requires the sound output based on the output request information.

When the sound output is requested, the processor 170 may release the connect with at least one external device not satisfying the necessary device condition information about the device type for the sound output in the list of connected devices. Therefore, when the connection with the Bluetooth device capable of sound output is required according to the execution of the application, the Bluetooth connection resources may be secured by releasing the Bluetooth connection with another external device.

According to embodiments of the present disclosure, in a display device in which the number of external devices connectable through Bluetooth communication is limited, the number of connectable devices is secured by automatically releasing a connection with external devices that are not required to execute an application among external devices already connected through Bluetooth communication so as to enable Bluetooth communication connection with external devices required according to an application being executed on the display device.

According to embodiments of the present disclosure, when the application being executed on the display device is changed, the number of connectable devices is secured to enable Bluetooth connection with external devices required by the changed application by releasing a connection with Bluetooth-connected external devices not required in the previously changed application for Bluetooth connection with external devices required according to the changed application.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:
1. A display device comprising:
 a communication interface configured to perform Bluetooth communication with at least one external device; and
 a processor configured to:
  obtain a list of connected external devices including capability information about at least one external device Bluetooth-paired or connected with the display device through the communication interface;
obtain first execution information about a first application being executed on the display device;
obtain first necessary external device capability information required by the first application based on the first execution information;
release a connection with one or more external devices not satisfying the first necessary device capability information in the list of connected external devices; and
maintain a state of being paired with the one or more external devices that is connection-released.

2. The display device according to claim 1, wherein, the processor is configured to maintain the connection with external devices Bluetooth-connected with the display device that satisfy the first necessary device capability information.

3. The display device according to claim 1, wherein the connection with one or more external devices not satisfying the first necessary device capability information is released based on a determination that a maximum number of external devices Bluetooth connected with the display device has been reached.

4. The display device according to claim 1, wherein the processor is configured to:
detect that an application being executed is changed from the first application to a second application;
obtain second execution information about the second application;
obtain second necessary external device capability information required by the second application based on the second execution information; and
release a connection with one or more external devices not satisfying the second necessary external device capability information in the list of connected external devices.

5. The display device according to claim 1, wherein the processor is configured to:
measure a use time of each of the at least one external device included in the list of connected external devices while the first application is being executed;
store the measured use time in association with each of the at least one external device; and
when the first application is re-executed, compare the use time of each of the at least one external device connected with the display device with a use time of each of at least one external device that is only paired with the display device, based on the list of connected external devices, and release a connection with one or more external devices connected with the display device which has a use time less than the use time of at least one external device that is only paired with the display device.

6. The display device according to claim 1, wherein the processor is configured to:
measure use start time information of each of the at least one external device included in the list of connected external devices while the first application is being executed, and store the measured use start time in association with each of the at least one external device, and
release a connection with an external device that has not transmitted/received certain data for a preset connection release reference time determined based on the use start time of each of the at least one external device included in the list of connected devices while the first application is being executed.

7. The display device according to claim 1, wherein the first execution information includes input request information about whether the first application is executing an operation requiring an input of a user, and necessary external device capability information about a device type for the input.

8. The display device according to claim 1, wherein the first execution information includes output request information about whether the first application is executing an operation requiring sound output, and necessary external device capability information about a device type for the sound output.

9. The display device according to claim 1, wherein the first application is an application that is executed in a foreground of the display device.

10. A method for managing a Bluetooth-connected external device, the method comprising:
performing Bluetooth communication with at least one external device;
obtaining a list of connected external devices including capability information about at least one external device Bluetooth-paired or connected;
obtaining first execution information about a first application being executed on the display device;
obtaining first necessary external device capability information required by the first application based on the first execution information;
releasing a connection with one or more external devices not satisfying the first necessary external device capability information in the list of connected external devices; and
maintaining a state of being paired with the one or more external devices that is connection-released.

11. The method according to claim 10, wherein connection is maintained with external devices Bluetooth-connected with the display device that satisfy the first necessary external device capability information.

12. The method according to claim 10, wherein the connection with one or more external devices not satisfying the first necessary external device capability information is released based on a determination that a maximum number of external devices Bluetooth connected with the display device has been reached.

13. The method according to claim 10, further comprising:
detecting that an application being executed is changed from the first application to a second application;
obtaining second execution information about the second application;
obtaining second necessary external device capability information required by the second application based on the second execution information; and
releasing a connection with one or more external devices not satisfying the second necessary external device capability information in the list of connected external devices.

* * * * *